United States Patent
Hughes et al.

(10) Patent No.: US 9,791,569 B2
(45) Date of Patent: Oct. 17, 2017

(54) COORDINATE MEASUREMENT SYSTEM AND METHOD

(71) Applicant: The Secretary of State for Business, Innovation & Skills, London (GB)

(72) Inventors: Edward Benjamin Hughes, London (GB); Matthew Stuard Warden, London (GB); Daniel Walton Veal, London (GB)

(73) Assignee: The Secretary of State for Business, Innovation & Skills, London (GB)

( * ) Notice: Subject to any disclaimer, the term of this patent is extended or adjusted under 35 U.S.C. 154(b) by 0 days.

(21) Appl. No.: 14/388,195

(22) PCT Filed: Mar. 28, 2013

(86) PCT No.: PCT/GB2013/050838
§ 371 (c)(1),
(2) Date: Sep. 25, 2014

(87) PCT Pub. No.: WO2013/144649
PCT Pub. Date: Oct. 3, 2013

(65) Prior Publication Data
US 2015/0085297 A1     Mar. 26, 2015

(30) Foreign Application Priority Data

Mar. 29, 2012     (GB) .................................. 1205563.8

(51) Int. Cl.
*G01B 9/02*     (2006.01)
*G01S 17/42*    (2006.01)
(Continued)

(52) U.S. Cl.
CPC ............ *G01S 17/42* (2013.01); *G01B 11/005* (2013.01); *G01S 7/481* (2013.01); *G01S 7/497* (2013.01); *G01S 17/46* (2013.01)

(58) Field of Classification Search
CPC ........ G01B 11/00; G01B 21/04; G01B 11/14; G01B 9/02; G01B 11/005; G02B 5/126;
(Continued)

(56) References Cited

U.S. PATENT DOCUMENTS 3,559,937 A     2/1971  Paine et al.
3,665,283 A     5/1972  Le Gall
(Continued)

FOREIGN PATENT DOCUMENTS

CA     2143838 A1    3/1994
CN     201900513 U   7/2011
(Continued)

OTHER PUBLICATIONS

Schneider, Carl-Thomas, "Lasertracer—A New Type of Self Tracking Laser Interferometer", IWAA2004, CERN, Geneva, Oct. 4-7, 2004.
(Continued)

*Primary Examiner* — Jamil Ahmed
(74) *Attorney, Agent, or Firm* — Thomas | Horstemeyer, LLP

(57) ABSTRACT

A position detection system is able to detect the three dimensional position of at least one target (10). Each target (10) is configured to act as a retro-reflector for light incident from any direction. At least one light emitter illuminates the at least one target (10) and at least one detector (24) is provided for detecting and taking measurements of light retro-reflected from a target (10). There is also provided a processor for processing measurements taken by each detector (24) to determine the three dimensional position of the at least one target (10).

19 Claims, 8 Drawing Sheets

(51) Int. Cl.
- G01S 17/46 (2006.01)
- G01S 7/481 (2006.01)
- G01S 7/497 (2006.01)
- G01B 11/00 (2006.01)

(58) Field of Classification Search
CPC .......... G01S 17/42; G01S 7/481; G01S 7/497; G01S 17/46
See application file for complete search history.

(56) References Cited

U.S. PATENT DOCUMENTS

| | | | |
|---|---|---|---|
| 3,809,477 A | 5/1974 | Russell | |
| 4,576,481 A | 3/1986 | Hansen | |
| 4,714,339 A | 12/1987 | Lau et al. | |
| 5,253,033 A | 10/1993 | Lipchak et al. | |
| 5,294,980 A * | 3/1994 | Matsugu | G03F 9/70 250/548 |
| 5,779,187 A | 7/1998 | Dulat et al. | |
| 6,147,748 A | 11/2000 | Hughes | |
| 7,139,446 B2 | 11/2006 | Slotwinski | |
| 7,268,348 B2 | 9/2007 | Binning et al. | |
| 2002/0021139 A1 | 2/2002 | Jackson | |
| 2003/0174401 A1* | 9/2003 | Brunner | A61B 19/54 359/534 |
| 2003/0234936 A1* | 12/2003 | Marron | G01B 11/2441 356/489 |
| 2006/0066836 A1* | 3/2006 | Bridges | G01B 11/024 356/5.13 |
| 2006/0227317 A1 | 10/2006 | Henderson et al. | |
| 2007/0015969 A1* | 1/2007 | Feldman | A61B 1/00096 600/160 |
| 2007/0194225 A1 | 8/2007 | Zorn | |
| 2008/0024793 A1 | 1/2008 | Gladnick | |
| 2008/0154538 A1* | 6/2008 | Stathis | G01C 15/002 702/152 |
| 2010/0258708 A1 | 10/2010 | Meyers | |
| 2011/0047661 A1 | 2/2011 | Leach et al. | |

FOREIGN PATENT DOCUMENTS

| | | |
|---|---|---|
| DE | 19611595 A1 | 9/1997 |
| DE | 10118668 A1 | 10/2002 |
| EP | 1760422 A1 | 3/2007 |
| EP | 2051101 A1 | 12/2011 |
| GB | 1010894 A | 11/1965 |
| GB | 2 285 550 A | 7/1995 |
| GB | 2285550 A | 7/1995 |
| GB | 2427912 A | 1/2007 |
| JP | 2002289243 A | 10/2002 |
| WO | 94/05970 A1 | 3/1994 |
| WO | 01/47427 A2 | 7/2001 |
| WO | 02068904 A1 | 9/2002 |
| WO | 2008/067349 A2 | 6/2008 |
| WO | 2009063217 A1 | 5/2009 |
| WO | 2011/029811 A1 | 3/2011 |
| WO | 2012/022955 A1 | 2/2012 |

OTHER PUBLICATIONS

Hughes, Ben, "Multilateration: Principles and Case Study", National Physical Laboratory, LVMC, Nov. 6, 2007.
Oakley, John P., "Whole-Angle Spherical Retro-Reflector Using Concentric Layers of Homogenous Optical Media", Applied Optics, vol. 46, No. 7, Mar. 1, 2007.
Reichold, Dr. A., "Frequency Scanning Interferometry for Laser Trackers and Laser Tracers", located at website: http://gow.epsrc.ac.uk/NGBOViewGrantaspx?GrantRef=EP/h018220/1, Jan. 2010.
Takatsuji, Toshiyuki, "Laser Tracking System for Coordinate Measurement", www.cenam.mx/ammc/eventos/evento2003/LaserTracker.pdf, 2003.
Dale, John, "A Study of Interferometric Distance Measurement Systems on a Prototype Rapid Tunnel Reference Surveyor and the Effects of Reference Network Errors at the International Linear Collider", Thesis submitted in partial fulfilment of degree of Doctor Philosophy at the University of Oxford, 2009.
Green, John R., "7. Development of a Prototype Frequency Scanning Interferometric Absolute Distance Measurement System for the Survey & Alignment of the International Linear Collider", Thesis submitted in partial fulfilment of degree of Doctor Philosophy at the University of Oxford, 2007.
Warden, Matthew Stuard, "Absolute Distnace Metrology Using Frequency Swept Lasers", Thesis submitted in partial fulfilment of degree of Doctor Philosophy at the University of Oxford, Aug. 2012.
International Search Report in co-pending related PCT Application PCT/GB2013/050838, dated Jun. 10, 2013.
Combined Search and Examination Report in co-pending, related GB 1300433.8, dated May 1, 2013.
Search Report in co-pending, related GB No. 1205563.8, dated Jul. 17, 2012.
Wikipedia Article on Retro-Reflectors: Snapshot from Mar. 20, 2012. See particularly the section with the title "Cat's Eye". (Ret4rieved Jul. 13, 2012). http://wikipedia.org/w/index.php?title=Retrofeflector&oldid=482958141.
Gerchberg, R., & Saxton, W. {1971 ). Phase determination for image and diffraction plane pictures in the electron microscope. Optik. Retrieved from http://scholar.google.co.uklscholar?hl=en&q=gerchberg+saxton&btnG=&as_sdt=125 %2C5&as_sdtp=#7.
Takatsuji, T., Goto, M., Osawa, S., Yin, R., & Kurosawa, T. (1999). Wholeviewing-angle cat's-eye retroreflector as a target of laser trackers. Measurement Science and Technology, 1 0(7), N87-N90. doi:1 0.1088/0957-0233/10/7/403.
Schneider, R., ThCirmel, P., & Stockmann, M. {2001 ). Distance 30 measurement of moving objects by frequency modulated laser radar. Optical Engineering, 40{1 ), 33. doi:1 0.1117/1.1332772.
Website located at: http://www.nikonmetrology.com/en_EU/Products/Large-Volume-Applications/iGPS/iGPS, downloaded on Jun. 3, 2015.
Website located at: http://www.metronor.com/products/duo/, downloaded on Jun. 3, 2015.
Website located at: http://aicon3d.com/products/moveinspect-technology.html, downloaded on Jun. 3, 2015.
Website located at: http://www.geodetic.com/products/systems/v-stars-d.aspx, downloaded on Jun. 3, 2015.
Zhuang, et al., "Modeling gimbal Azis Misalignments and Mirror Center Offset in a Single-Beam Laser Tracking Measurement System", the International Journal of robotics Research, vol. 14, No. 3, Jun. 1995, pp. 211-224.
Reichold, et al., "The Licas-RTRS—A Survey System for the ILC*", Proceedings of EPAC 2006, Edinburgh, Scotland, pp. 520-522.
Wang, et al., "Progress and analysis of the liquid crystal phased array technology in ladar", IEEE, 2010, pp. 273-276.
Xun, et al., "System for demonstrating arbitrary multi-spot beam steering from spatial light modulators", Optics Express, vol. 12, No. 2, Jan. 26, 2004, pp. 260-268.
Hassebrook, et al., "Dynamic Spot Pattern Projection to Detect and Track Object Motion", Optical Pattern Recognition XII, Proceedings of SPIE, vol. 4387, 2001, pp. 232-237.
Satyan, et al., "Chirp Multiplication by Four Wave Mixing for Wideband Swept-Frequency Sources for High Resolution Imaging", Journal of Lightwave Technology, vol. 28, No. 14, Jul. 15, 2010, pp. 2077-2083.
Stoyanov, et al., "Modelling and Prototyping the Conceptual Design of 3D CMM Micro-probe", 2nd Electronics Systemintegration Technology Conference, Greenwich, UK, 2009, pp. 193-198.
Schneider, et al., "Distance measurement of moving objects by frequency modulated laser radar", Society of Photo-Optical Instrumentation Engineers, Opt. Eng. 40(1), Jan. 2001, pp. 33-37.
Coe, et al., "Frequency scanning interferometry in ATLAS: remote, multiple, simultaneous and precise distance measurements in a hostile environment", Institute of Physics Publishing, Measurement Science and Technology, 15, 2004, pp. 2175-2187.

(56) References Cited

OTHER PUBLICATIONS

Satyan, "Optoelectronic Control of the Phase and Frequency of Semiconductor Lasers", California Institute of Technology, Pasadena, California, 2011, 214 pages.
Chinese Office Action dated Jan. 7, 2016 in related, copending Chinese Application No. 201380025699.0.

* cited by examiner

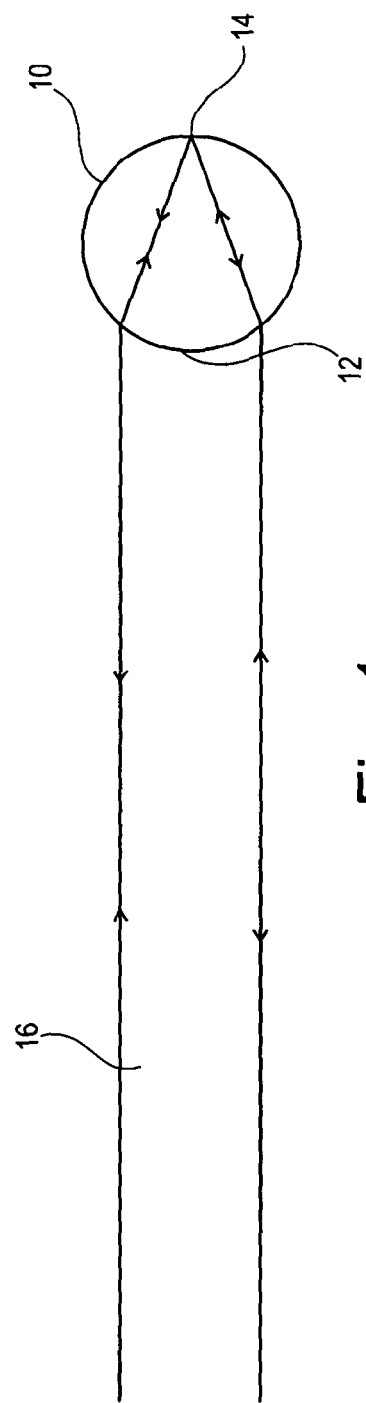

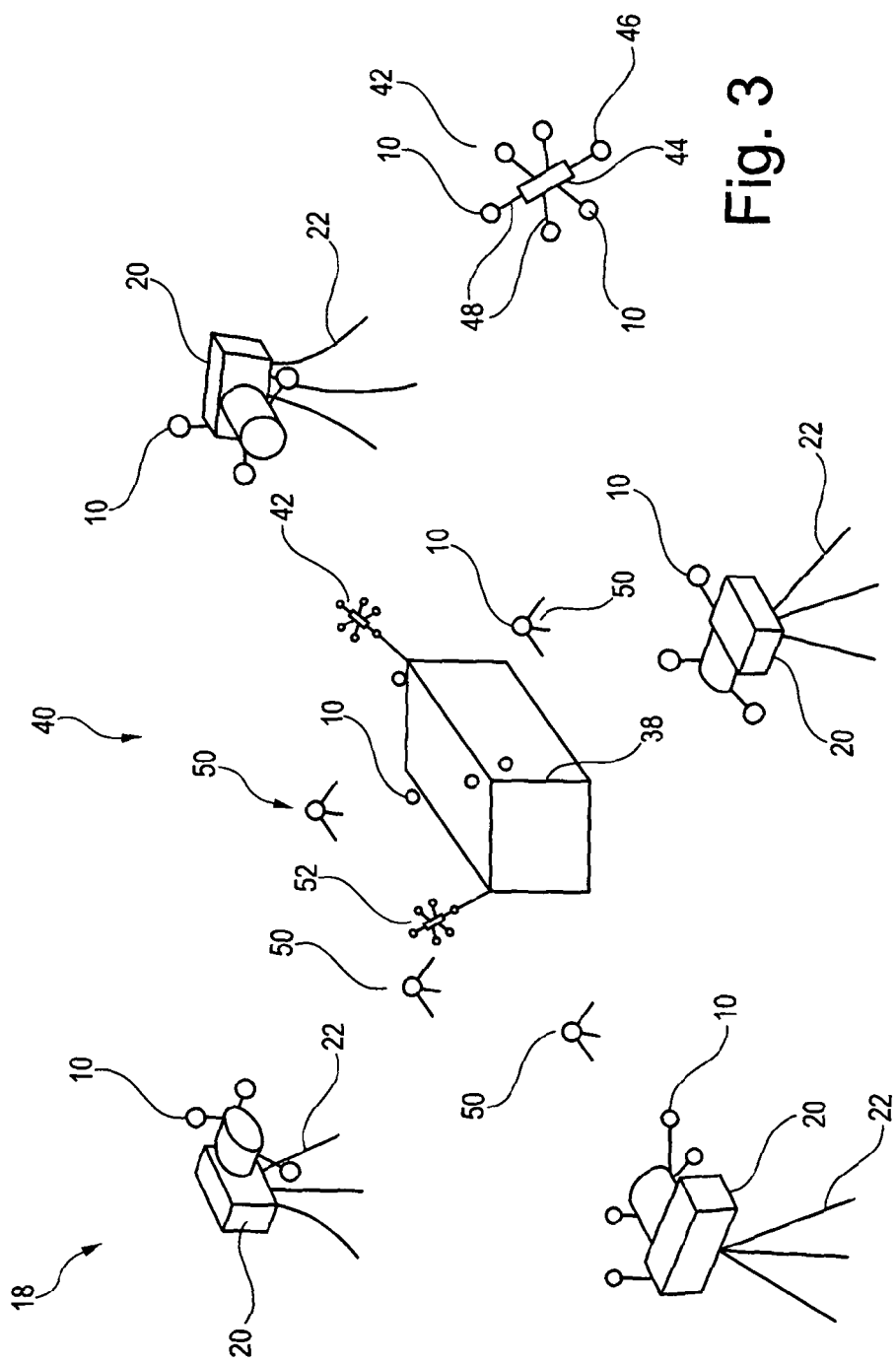

COORDINATE MEASUREMENT SYSTEM AND METHOD

CROSS-REFERENCE TO RELATED APPLICATION

This application is the 35 U.S.C. §371 national stage of, and claims priority to and the benefit of, PCT application PCT/GB2013/050838, filed Mar. 28, 2013, which claims priority to and the benefit of GB Application No. 1205563.8, filed on 29 Mar. 2012, herein incorporated by reference in its entirety.

The present invention relates to a coordinate measurement method and system such as a coordinate measurement system for use, for example, in large volume metrology and metrology assisted assembly and coordinate metrology in general.

Throughout the description and claims below, a coordinate measurement system shall be referred to as a position detection system.

Various methods exist for detecting the three dimensional position of an object within a volume. Known methods include, for example, photogrammetry (or videogrammetry), laser tracker and multilateration.

A laser tracker uses a combination of angle and range based sensors. It emits a narrow collimated laser beam to a special retro-reflective target such as a spherically mounted retro-reflector (SMR). The SMR reflects the beam back to the instrument along the same path as the emitted beam. A sensor in the laser tracker detects movement of the SMR and steers the laser beam to follow the SMR at all times. Angle encoders on the beam steering mechanism measure vertical and horizontal angles from the laser tracker to the SMR and a laser based range measurement system measures distance to the SMR. This combination of two angles and a range give the three-dimensional coordinates of the SMR in spherical polar form.

A disadvantage of this technique, as with many prior art techniques, is that line of sight is required between the single instrument and the target. When the technique is being used, for example, in the assembly of a large construction, such as an aircraft, maintaining line of sight between the laser tracker and target is difficult, particularly as the components move.

One way of overcoming the line-of-sight issue is to move the measurement system from one place to another. In the case of a laser tracker, it would be necessary to then establish a consistent coordinate system. Another method is to employ a distributed measurement system such as photogrammetry.

Photogrammetry involves detection of the three dimensional position of an object from two or more photographic images taken from different positions. The pictures may be taken one after the other using the same camera, or simultaneously using multiple cameras. If images and coordinates are processed in real time at video frame rates, the technique is often called videogrammetry. Various common reference points can be identified in each image and a line of sight (ray) can be mathematically constructed from the camera image to the physical reference point. The direction of each ray relative to the camera can be described in terms of two angles. If the location (position and orientation) of the cameras is known, the intersection of these rays determines the three-dimensional coordinates of the point. If enough photographs are taken and sufficient reference points are identified, the system is said to be over determined and can be solved to determine the locations and orientations of the cameras as well as the reference point coordinates. The system is thus self-calibrating.

In practice, it is normal to use flash illumination in combination with highly reflective targets located at points of interest on the object being measured. These targets are normally flat, two-dimensional and regular shapes. The combination of high reflectivity, flash illumination and regular shape produces high contrast image and makes identification and image processing easier.

The disadvantage of these targets is that they reflect illumination over a limited angular range and are effectively only visible from one side.

Systems for photogrammetry are also known in which active targets are used. One such system comprises light emitting diodes (LEDs) attached to a hand-held probe, which, in turn is used to probe the points to be measured. A plurality of cameras is then used to detect the light emitted by the LEDs and the angle at which it is received thence the location of the LEDs, and thence the position and orientation of the probe and probe tip can be calculated. As with the reflective targets mentioned above, LED targets have a limited angular range of operation. This limits the maximum separation of cameras which means that accuracy reduces as the probe is moved away from the cameras. So, such a system is limited to a relatively small volume. As a result of this, the system often has to be rearranged and/or repositioned in order to measure a different feature.

Some systems attempt to address this issue of limited angular range and distance by introducing redundancy into the system. For example, replacing a single instrument with a distributed instrument which surrounds the measurement volume provides some flexibility to line of sight issues and overcomes the problem of accuracy diminishing with distance between a single instrument and target.

One such system comprises a plurality of rotating laser sources at fixed points surrounding the measurement volume. A plurality of targets comprising cylindrical photo-detectors is affixed to objects to be measured. Each of the targets produces a pulse when it detects a passing laser beam. The timing of this pulse with respect to the rotation of the laser sources allows the angle of incidence of the light from that particular laser source to be calculated.

This system has the advantage that some beam interruption can be tolerated provided at least two laser sources are visible from each photo-detector. However, since the beams from different laser sources are detected by a photo-detector at different points during the rotation of the laser sources, movement of the photo-detector between detecting light from different laser sources has an effect on the calculated position. This means that the position calculated is only ever an average position over a cycle of the rotating laser sources.

In addition, both the laser sources, and the photo-detectors which form the targets, are active devices requiring power and complex components, meaning that introducing additional redundancy into the system for either sources or targets is expensive.

Furthermore, as with photogrammetry and other inherently angle based measurement systems, an auxiliary method is required to introduce scale into the system. This is typically achieved using a calibrated reference length or scale bar.

A further disadvantage of systems based on optical angle measurements is that such devices are inherently less accurate than optical range measurement systems due to the disproportionate effect of the atmospheric disturbance on the direction of a light ray over its length.

The technique of multilateration is inherently more accurate than angle based techniques. Multilateration uses a combination of range measurements from multiple fixed positions to a moving target to determine the coordinates of the target. If at least four range measurement devices are used to track the target, the system is over determined and the locations and orientations of the range measurement devices as well as the target coordinates can be determined. Multilateration can be performed by laser trackers which measure the absolute distance to the target from the source.

However, unlike photogrammetry, mutlilateration with laser trackers can only be used to address a single target at a time.

The present invention seeks to provide an improved position detection system and method.

According to an aspect of invention, there is provided a position detection system for detecting the three dimensional position of at least one target, comprising:

at least one target, wherein the or each target is configured to act as a retroreflector for light incident from substantially any direction;

at least one light emitter for illuminating the at least one target;

at least one detector for detecting and taking measurements of light retro-reflected from a target; and a processor for processing measurements taken by the or each detector to determine the three dimensional position of the at least one target.

Preferably, the at least one detector is a plurality of detectors.

Preferably, the at least one light emitter is a plurality of light emitters.

In embodiments, the or each detector is arranged such that, adjacent to a target, an optical path from that target to the detector coincides with an optical path along which light is incident on that target from a light emitter.

In embodiments, the or each detector has a corresponding light emitter arranged such that an optical path from a light emitter to a target at least partially coincides with an optical path from that target to the corresponding detector such that light incident on a target from a light emitter is retro-reflected along an optical path to the corresponding detector.

As explained above, a problem with the prior art is that for angle based measurement, as a target moves away from a detector, the error in the angle measurement becomes increasingly significant, reducing the accuracy of the measurement. By providing a target which is configured to act as a retro-reflector for light incident from any direction, a target can preferably be surrounded by detectors. Accordingly, as the target moves further away from one detector, it is likely to move nearer to another detector, and therefore as the error becomes more significant with respect to one detector, it becomes less significant with respect to another detector, and the overall accuracy therefore remains similar throughout the volume.

Surrounding a target with detectors rather than having detectors only on one side can also increase the likelihood that the target is in a line of sight of several detectors, and reduce the need for redundant detectors or targets.

Preferably, the or each target is surrounded by light emitters. Surrounding a target with light emitters rather than having light emitters only on one side can increase the likelihood that the target is in a line of sight of several light emitters and reduce the need for redundant light emitters or targets.

When a target is surrounded by light emitters or detectors, there are preferably at least two emitters or at least two detectors arranged around the target such that the angle measured from the target which separates the at least two detectors or the at least two emitters is approximately 90°.

Preferably, the or each target is passive. Thus, multiple redundant targets can be introduced into the system at comparatively little cost relative to systems that have active targets. With redundant targets, it is more likely that at least one of the targets for a given object to be measured will be within line of sight of multiple emitters and/or multiple detectors.

Preferably, the or each detector can capture an image of a plurality of targets in its field of view.

In one implementation, the or each detector is a digital camera of sufficient pixel resolution and speed to suit the data rate required by the system. Sufficient pixel resolution is defined as a target projected onto the detector being comprised of enough pixels for a good centroid location: the more pixels used to calculate the centroid the more accurate its location. In some embodiments, a target image is at least five pixels in diameter. The data rate (frame rate) is limited by the camera and computational algorithm, and is also based on the speed requirement of the process being measured.

Preferred embodiments of the system provide flexibility, accuracy and scalability. The system can be scaled for a different sized volume by using more or fewer detectors and emitters.

Preferably, the or each target is generally spherical, and more preferably the or each target is a sphere. The surface of a spherical target is able to act as a lens to focus light incident on a region of the external surface onto a diametrically opposed point of the internal surface. From this point, a percentage of the light is reflected to the region on which the light was originally incident. The lens effect of this region then directs the light back along its incident path. A spherical retro-reflector can reflect a nominally collimated beam that is incident on its centre back along the path of incidence. Similarly, the portion of a broader beam incident on the retro-reflector will be reflected back along the path of incidence.

Advantages of a spherical retro-reflector include that it appears as a point source and is not distorted by perspective as is the case with most conventional photogrammetry targets. Spherical retro-reflectors thereby remove a significant cause of measurement error. They can retro-reflect light incident upon the centre of the spherical retro-reflector, improving centroid identification, which is another significant factor in the accuracy of photogrammetric systems. Passive spherical retro-reflectors are also significantly cheaper and lighter than active targets, since they contain no electronics.

Preferably, the or each target appears the same from any direction. Identification of a target therefore does not depend upon the angle of view between the detector and the target. This can avoid the amount of retro-reflected light received at a detector and the apparent shape of the target changing with angle.

Preferably, the or each target comprises glass and more preferably is made of glass.

It has been shown that the or each spherical target acts as a retro-reflector when it is composed of a solid material with refractive index between $\sqrt{2}$ and 2, and works most efficiently with a refractive index between 1.95 and 2.

Preferably, each light emitter emits light from a light source and more preferably from a laser source wherein light emitted by each light emitter is laser light. In some embodiments, each light emitter includes such a light source. In other embodiments, each light emitter includes an optical fibre which directs light from such a light source. In further embodiments, at least one light emitter includes such a light source and at least one light emitter includes an optical fibre that directs light from such a light source. Providing laser light facilitates the provision of light with a wavelength within a pre-determined range for which the target has a preferred refractive index. In some embodiments, a light emitter does not need to include a light source. For example, optionally, a single source may be used to generate light for multiple emitters. This may be, for example, a fibre-coupled laser source where fibre splitters are used to separate out the laser light into multiple parts, and optical fibre is used to transport each part to a light emitter.

In embodiments of the invention, each light emitter is configured to emit red laser light and the or each target comprises glass which for red light has a refractive index in the preferred range. In one embodiment, the or each target is made of S-LAH 79 glass which has a refractive index of 1.996 for a wavelength of 632.8 nm.

Preferably, the system comprises a plurality of detection units, each detection unit comprising a light emitter and a detector, wherein the detector of each detection unit is operable to detect and take measurements of retro-reflected light which was originally emitted by the light emitter of the same detection unit. Preferably, the light emitter of each detection unit is fixed to the detector of the same detection unit.

Preferably, the emitter and detector of each detection unit are arranged such that an optical path from the emitter to a target substantially coincides with an optical path from the target to the detector. The emitter and detector of each detection unit are preferably also arranged such that an optical path length from the emitter to a target is substantially equal to an optical path length from the target to the detector.

Preferably, the or each light emitter comprises means for diverging light for causing the emitted light to diverge. The means for diverging light may be for example a lens or a curved mirror. The means for diverging light preferably is configured to diverge light to illuminate a generally conical region.

Configuring the or each light emitter such that the emitted light diverges, for example in a cone, means that the or each light emitter can illuminate a larger volume than would be the case if the light emitter emitted a collimated beam. There is therefore a larger volume from which light can be retro-reflected to the or each detector and the field of view of the or each detector can therefore be increased. This provides advantages including the need for fewer detectors in order to monitor a volume. Preferably, the field of view of the detector of each detection unit is the region illuminated by the light emitter of the same detection unit.

Preferably, the or each detector is arranged to detect light retro-reflected directly at a light emitter and more preferably the detector of each detection unit is arranged to detect light retro-reflected directly at the light emitter of the same detection unit. This is able to overcome problems in the prior art in which the optical paths of the light emitted by an emitter and detected by a detector do not precisely overlap. For example, a ring flash source arranged around a detector would, with the preferred retro-reflector cause insufficient retro-reflected light to be detected since the majority of the retro-reflected light is directed directly back at the ring flash rather than at the detector. A detector according to a preferred embodiment of the invention is therefore able to maximise the retro-reflected light detected.

Preferably, overlap of optical paths of emitted and detected light is achieved by through-the-lens illumination. Preferably, the or each light emitter is configured to emit light along and on an axis corresponding to an axis around which a corresponding detector is configured to receive light. The or each light emitter may comprise means for directing light configured to direct light emitted by the or each light emitter in a predetermined direction and to direct retro-reflected light to a detector, preferably the detector of the same detection unit. The or each means for directing light preferably comprises a lens, but can comprise any light directing apparatus, such as a curved mirror. The or each means for directing light preferably also comprises a beam splitter.

The means for directing light comprising a beam splitter can enable light to be introduced to the light emitter transversely to a principal direction of emission from the detection unit.

Preferably the or each beam splitter is supplemented by a quarter wavelength plate in order to minimise the amount of light lost.

Each detection unit can comprise a camera to provide the detector.

All of the detection units can be synchronised by using a common triggering mechanism for each image acquisition.

Embodiments of the invention can be used in a photogrammetry mode in which the or each detector is configured to take measurements of the angles at which retro-reflected light is received using standard photogrammetry triangulation techniques. Such angle measurements from a plurality of detectors or from a single detector in a plurality of locations can be processed by the processor to derive position locations for the or each target.

An advantage of this mode is that there is little restriction on where the or each detector needs to be placed for each measurement.

Photogrammetry mode is preferably calibrated, for example by the use of a scale bar.

To assist calibration of this mode, each detector or detection unit can have affixed to it at least one target. Using the technique described above, the relative positions of each of the detectors can be determined to provide a reference coordinate system for measuring the position of objects. This can reduce the time and skill required to calibrate a system in order to provide accurate measurements. It can also help with drift monitoring to ensure continued accuracy of the system.

Embodiments of the invention can be used in multilateration mode in which the or each detector is configured to measure the absolute distance of a or each target from the respective detector. Frequency scanning interferometry is one of several methods that can be used to measure the absolute distance, for example by modulating or tuning the wavelength of light emitted by the or each light emitter.

Frequency scanning interferometry is a method of measuring unambiguously the optical path difference (OPD), D, between the two ends of an interferometer by comparison with the known OPD, L, of a 'reference' interferometer. For example, if both interferometers are illuminated with the same laser, which is then tuned over a frequency interval $\Delta v$, the phase change $\Delta\Phi$, induced in the reference interferometer will be $$\Delta\Phi = \frac{2\pi}{c} L \Delta v$$

where, c, is the speed of light. Similarly the phase change, $\Delta\theta$, induced in the unknown interferometer will be $$\Delta\theta = \frac{2\pi}{c}D\Delta v$$

The unknown length, D, is then simply given by $$D = \frac{\Delta\theta}{\Delta\Phi}L$$

Those skilled in the art will recognise that there are numerous variations and improvements on this basic scheme. For example, analysis in the frequency domain can be used to distinguish the signals from multiple targets that are illuminated simultaneously.

If the length of the reference interferometer, L, has been suitably calibrated, then there will be traceability between measurements taken by the or each detector and the meter. It can also greatly improve the fidelity of measurements due to environmental effects, such as beam bending due to variation in refractive index along the optical path, coordinates determined from length data are typically an order of magnitude more accurate than coordinates determined from angle data.

However, used in isolation, frequency scanning interferometry would not be able to distinguish which measured distance was associated with which target in a computationally efficient way. Though a "brute force" approach that tries every possible combination can be used.

Embodiments of the invention can be used in a combined mode in which the or each detector is configured to take measurements of both the angle at which retro-reflected light is received, and the absolute distance from the respective detector of the or each target from which the light is retro-reflected. The processor can use the angle measurements to correlate which distance measurements relate to which target. Once this correlation has been performed, the processor can use the absolute distance measurements to calculate accurately the position of the or each target.

Furthermore, it is not necessary for the absolute distance between the or each detector and the or each retro-reflector to be measured and indexed to a particular target. Instead a range of discrete possible ranges could be determined, and the "correct" (or unambiguous) range chosen based on the most likely option determined by the detector-target distance derived from the range data and/or angle data from one or more other detectors.

Preferred embodiments provide an improved position detection system and method, based on omni directional targets, that combines the accuracy of multilateration with the simultaneous multi-target capability of photogrammetry whilst overcoming the line of sight and decreasing accuracy with range issues.

Preferably there is a plurality of detectors.

As described above, despite its increased accuracy over photogrammetry, multilateration implemented conventionally with laser trackers can only be used with a single target. However, by using angle measurements to correlate distance measurements from different detectors, preferred embodiments of the present invention can utilise the more accurate multilateration technique to calculate the position of multiple targets.

The combination of multilateration mode and photogrammetry mode can increase the robustness and reliability of the system because the target coordinates are essentially derived from a combination of two over-determined systems.

The processor can process measurements using mathematical software employing data fusion and fitting algorithms. The combination of photogrammetry, multilateration and the mathematical software can provide a very flexible, robust, self-calibrating, drift-compensating system. It can provide better data quality and more data redundancy.

According to another aspect of the invention, there is provided a method of determining the three dimensional position of an object, comprising:

affixing a target to an object, wherein the target is configured to act as a retro-reflector for light incident from any direction;

illuminating the target with light from at least one light emitter;

detecting and taking measurements of light retro-reflected from the target; and processing measurements of the retro-reflected light to determine the three dimensional position of the target and thence determining the three dimensional position of the object.

The features of this method can correspond to the features described in respect of the systems described above.

According to an aspect of the invention, there is provided a detection unit including a detector and a light emitter, wherein the light emitter is configured to emit, away from the detection unit, light along and on an axis corresponding to an axis on and around which the detection unit is configured to receive light for detection by the detector.

Embodiments of the invention are described below, by way of example only, with reference to the accompanying drawings, in which:

FIG. 1 is a schematic drawing of a target for use in a system according to an embodiment of the invention:

FIG. 2 is a schematic diagram of a position detection system according to the embodiment of FIG. 1, set up to measure an object;

FIG. 3 is a schematic depiction of a handheld probe for use in the position detection system of the embodiment of FIGS. 1 and 2;

Figure 4:
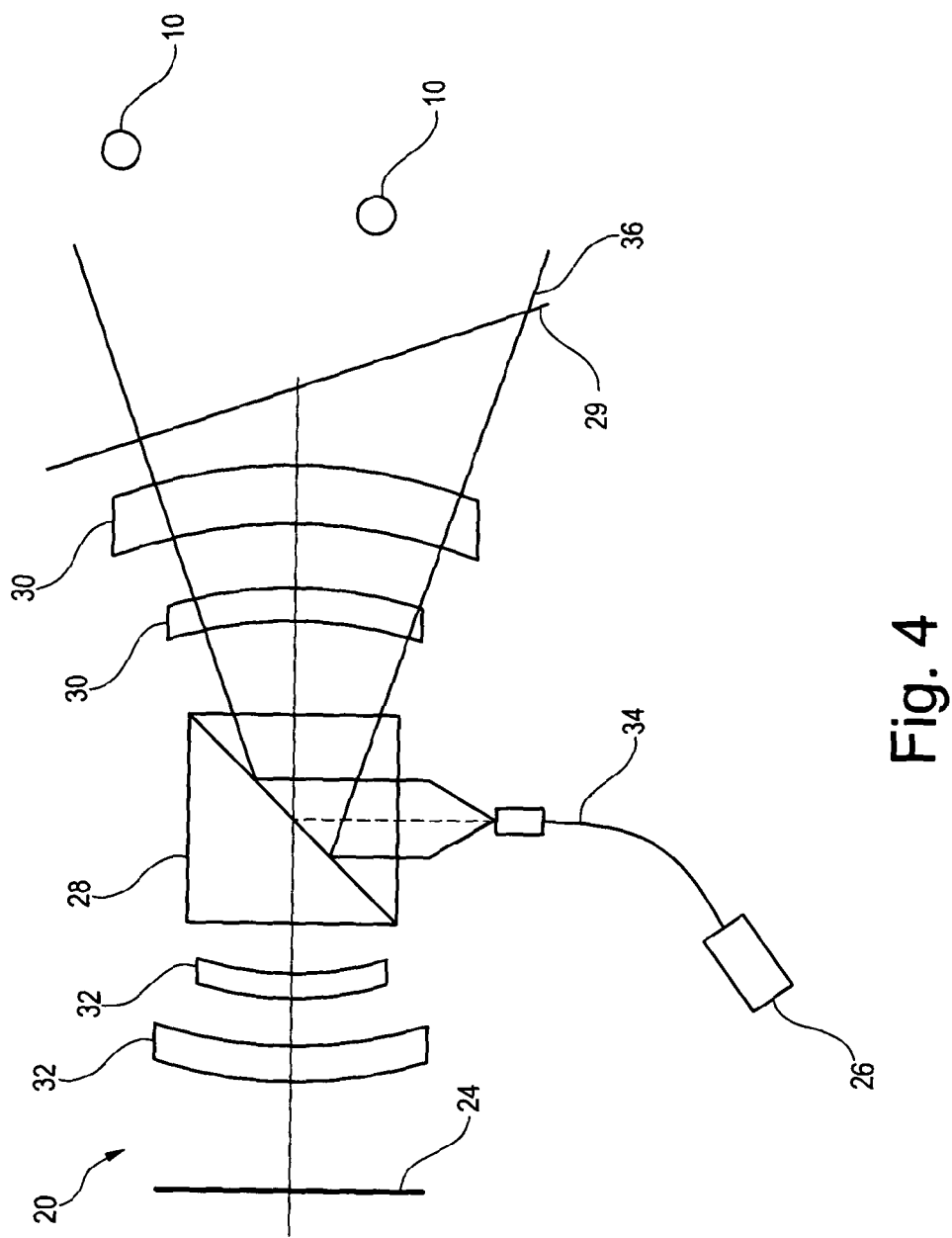
FIG. 4 is a schematic diagram of a cross section of a detection unit for use in the position detection system of FIGS. 1 to 3.

Embodiments of the invention can utilise angle-based measurement and/or absolute distance measurement. With reference to FIGS. 1 to 5, embodiments utilising angle based measurement are described below.

With reference to FIG. 1, a target 10 comprises a glass sphere. The sphere is made from S-LAH 79 glass which has a refractive index of 1.996 for light with a wavelength of 632.8 nm. The material has been chosen for this embodiment in order to work with red laser light. However, different materials can be used, particularly if a different frequency of light is to be used. The material should preferably have a refractive index in the range of from 1.9 to 2.1 or more preferably from 1.95 to 2 for the light being used.

As can be seen from FIG. 1, light which is incident on the centre of the target, along a path 16 onto a region 12 of the target 10, is focussed onto a point 14 diametrically opposite the region 12. This occurs as a result of the lensing effect of the spherical target 10. A percentage of the light is reflected from the point 14 back to the region 12, where the lensing effect of spherical target 10 directs the reflected light back along the incident path 16 towards the source of the light. The target 10 thereby acts as a retro-reflector.

Since the target 10 is spherical, it will appear substantially the same, and have substantially the same properties for all directions of incidence. The retro-reflecting effect therefore occurs for light of any angle of incidence and the target 10 thereby serves as a retro-reflector for light incident from any direction.

FIG. 2 is a schematic diagram of a position detection system 18 using targets 10 as described with respect to FIG. 1.

The system 18 shown in FIG. 2 is arranged to detect the position of an object 38 within a volume 40. The volume 40 can be for example an assembly hall or smaller volume. The system 18 comprises a plurality of detection units 20 arranged at various locations around the volume. Each detection unit 20 is mounted on a tripod 22 for stability.

A detection unit 20 is described below with reference to FIG. 4.

As can be seen in FIG. 4, a detection unit 20 comprises a detector 24 and a light emitter including a light source 26.

The detector 24 is any detector suitable for detecting and taking measurements of light including the angle of incidence of light. Examples of such a detector include a high resolution CCD or CMOS sensor.

The light source 26 is a laser diode. In this embodiment, the light source 26 is configured to emit red laser light at a wavelength of 632.8 nm. However, other frequencies of light can be used, including infra-red or other frequencies of visible light. In addition other light sources which are operable to emit light within a predetermined range of wavelengths can be used, such as LEDs. Preferably the light source is a laser and preferably it is linearly polarised.

Unit 20 also includes a polarising beam splitter 28 between a first set of lenses 30 and a second set of lenses 32. The beam splitter 28 is arranged to be coaxial with both the first set of lenses 30 and the second set of lenses 32. A quarter wavelength plate 29 is provided after the first set of lenses 30 and the beam splitter 28. The quarter wave plate can change the polarisation of light to enable it to pass through (rather than be reflected inside) the beam splitter cube 28 and reach the detector 24 after it has been reflected by the target.

A non-polarising beam splitter can be used instead of a polarising beam splitter 28, in which case the quarter wave plate 29 would not be required to change the polarisation.

The source 26 is operable to emit a beam of polarised light towards the beam splitter at an angle transverse to the axis of the first and second sets of lenses 30 and 32. A fibre optic cable 34 is provided to guide the light from the source towards the beam splitter 28. In this embodiment, the light emitter comprises the light source 26, the fibre optic cable 34, the beam splitter 28 and the first set of lenses 30. However, in some embodiments, the source 26 is arranged to emit light directly to the beam splitter 28 without the need for the fibre optic cable 34.

The beam splitter 28 is arranged to re-direct the light beam from the laser diode 26 towards and coaxially with the first set of lenses 30. The first set of lenses 30 is configured to cause the light beam to diverge and to be emitted from the detection unit to illuminate a conical region 36 of the volume 40. However, the region 36 does not have to be conical. Any divergence of the light increases the field of view of the detection unit 20 and therefore reduces the number of detection units 20 required and/or reduces the amount the detection units 20 need to be redirected during operation.

The arrangement also results in the first set of lenses 30 being configured to cause light which has been retro-reflected from the region 36 to be directed onto the beam splitter 28. The beam splitter 28 allows some of the retro-reflected light to pass to the second set of lenses 32. The second set of lenses 32 is configured to focus light received from the beam splitter 28 onto the detector 24 such that the position on the detector 24 at which light is focussed directly correlates to the angle with respect to the axis of the first and second sets of lenses 30, 32 at which it was incident at the first set of lenses 30.

There are other embodiments in which the second set of lenses 32 is not required.

The detector 24 is operable to take measurements of the light detected. In particular, the detector 24 is operable to measure the angle relative to the axis of the first and second sets of lenses 30, 32 at which retro-reflected light is incident at the first set of lenses 30 using the correlation described above.

The above described preferred embodiment of the detection unit 20 comprises first and second sets of lenses 30, 32. Each of the first and second sets of lenses 30, 32 comprises multiple lens elements. However, the first and second sets of lenses 30, 32 can be replaced with a single lens for each. Alternatively, one or more curved mirrors can be used to replace each of the first and second sets of lenses 30, 32. The first and second sets of lenses 30, 32 can be omitted altogether. However, in this case, the region 36 illuminated by the light emitter will be limited in size, reducing the field of view of the detection unit 20.

Figure 5:
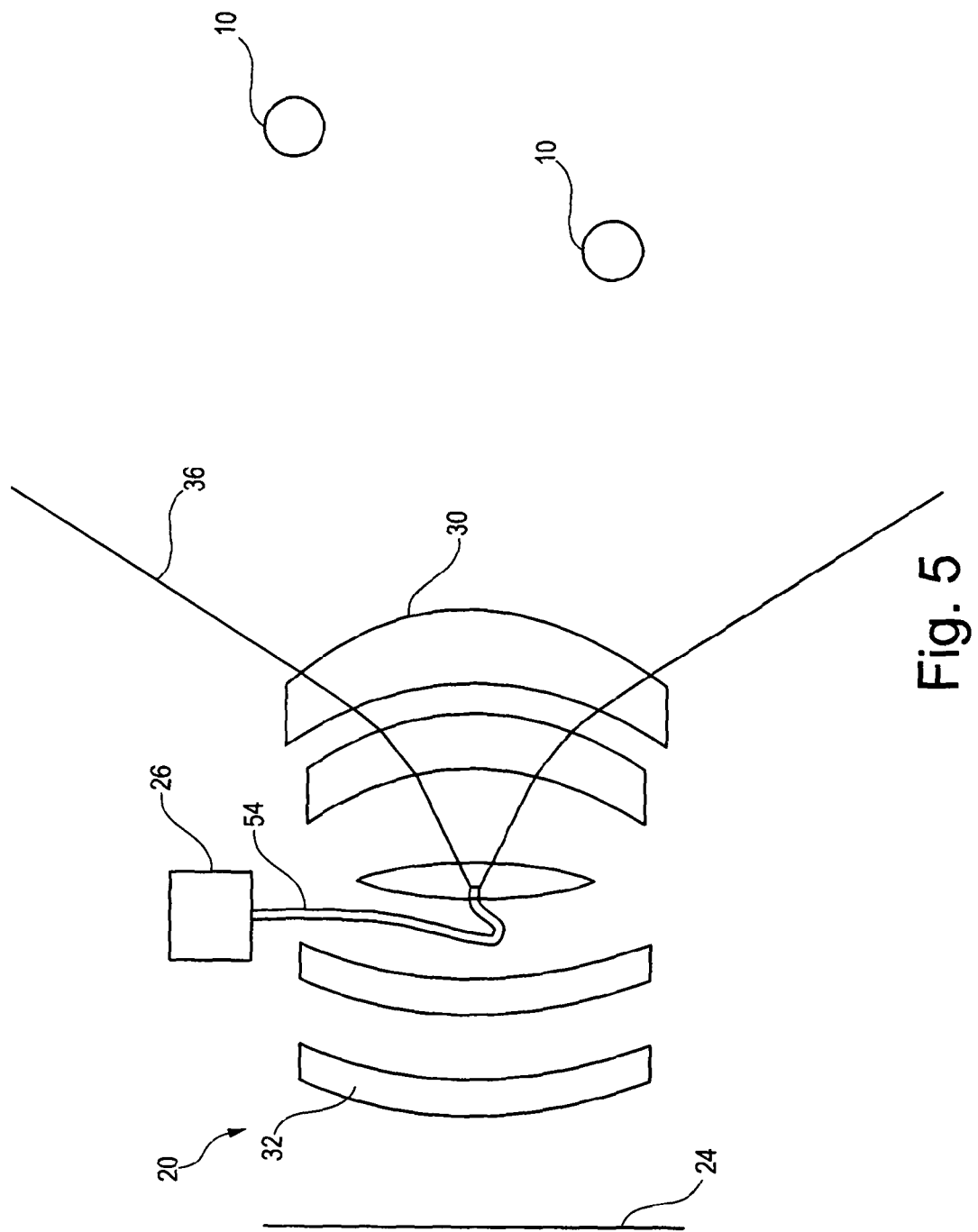
FIG. 5 is a schematic diagram of a cross section of a detection unit according to an embodiment of the invention.

Embodiments of the invention omit the beam splitter 28 and the quarter wavelength plate 29, but an end of the fibre optic cable 34 is directed to guide the light along the axis of the first set of lenses 30. An embodiment is shown in FIG. 5.

Referring again to FIG. 2, as described above, each detection unit 20 is operable to illuminate a region 36 of the volume 40. The detection units 20 are arranged such that the plurality of regions 36 that are illuminated result in the entire volume 40 being illuminated.

There may be fixed targets 50 located within the volume 40 that provide fixed reference points that define a coordinate frame.

The object 38 has affixed to it a plurality of targets 10, the targets 10 being as described in relation to FIG. 1. In one mode of operation, the fixed targets 10 affixed to object 38 can be used to determine the position and orientation of the object 38 in the coordinate frame defined by fixed targets 50.

In another operating mode, a probe 42 can be used to measure features on an object 38. The probe 42 is described below in more detail with reference to FIG. 3.

FIG. 3 shows a probe 42 comprising a probe body 44 extending away from a probe tip 46. The probe tip 46 can be used to probe the object 38.

The probe body 44 has extending away from it at various positions along its length and at various angles target supports 48 onto each of which is mounted a target 10 according to FIG. 1.

In this way, the probe 42 provides a means by which the coordinates of the probe tip 46 can be located even if the probe tip 46 is hidden from view of the detection units 20. Referring again to FIG. 2, as described above, each of the detection units 20 may have affixed to it a plurality of targets 10 according to FIG. 1. Probes 42 can be hand-held to provide a manual probing capability.

The fixed targets 50 can be in the form of a plurality of reference targets 50, comprising a target 10 on a tripod or other form of support or fixing, which are provided at various locations within the volume 40 to provide reference points with respect to which the position of the targets 10 affixed to the object 38 can be compared. The reference targets 50 can provide a dimensional reference to introduce scale into the system from which angle data can be converted into length, when the system is operating in photogrammetry mode only.

The detection units 20 are all synchronised and configured to communicate with a central processor (not shown). The communication is by a wireless radio connection. However, other means of communication such as a wired connection can be used.

Each of the detectors is configured to communicate any measurements taken to the central processor.

The preferred operation of the system 18 is described below.

First, the system 18 is calibrated. A possible method of calibration is using a three dimensional artefact comprising a plurality of targets 50 in a known configuration that has been measured independently, for example with a laser tracker.

A plurality of detection units 20 are arranged around the volume 40. Each of the detection units is operated such that the source 26 emits light.

The light emitted by the source 26 is conveyed by the fibre optic cable 34 to the beam splitter 28.

The beam splitter 28 redirects the light to the first set of lenses 30, which causes the light to diverge to be emitted to illuminate the region 36 of the volume 40.

The plurality of detection units 20 may be arranged such that at least one of the targets 10 affixed to each detection unit 20 is within the regions 36 of at least two other detection units 20. As described above, a plurality of fixed reference targets 50 may be placed within the volume 40.

The light from one of the detection units 20 which is incident upon a target 10 or 50 is retro-reflected towards the detection unit which originally emitted the light as described in relation to FIG. 1.

Retro-reflected light which is incident on the first set of lenses 30 of the detection unit 24 which originally emitted the light is directed by the first set of lenses 30 through the quarter wavelength plate 29 and the beam splitter 28, and is directed by the second set of lenses 32 onto the detector 24.

The detectors 24 of each of the detection units 20 take measurements of the position on the detector 24 at which the light is detected. From this data, the angle with respect to the axis of the first and second sets of lenses 30, 32 at which the light is incident at the first set of lenses is calculated.

Each of the detectors 24 communicates these measurements to the central processor.

The central processor is operated to process the measurements from each of the detection units to determine the relative position of the detection units 20 (in some embodiments the relative position of the cameras) by bundle adjustment algorithms. Those skilled in the art will be familiar with bundle adjustment which, in a single mathematical model, simultaneously calculates parameters of interior and exterior orientation of the detection unit 20 or camera (focal length, position, orientation, etc.) as well as target coordinates for an unlimited number of targets and detection units 20 or cameras. This technique is based on the colinearity equations, which link the 2D target coordinate on the image plane with the 3D position of the targets in object space as well as the 3D orientation and position of the detection unit/camera. For example, $$x = x_0 + f \frac{r_{11}(X - X_0) + r_{21}(Y - Y_0) + r_{31}(Z - Z_0)}{r_{13}(X - X_0) + r_{23}(Y - Y_0) + r_{33}(Z - Z_0)} + \Delta x$$

and $$y = y_0 + f \frac{r_{12}(X - X_0) + r_{22}(Y - Y_0) + r_{32}(Z - Z_0)}{r_{13}(X - X_0) + r_{23}(Y - Y_0) + r_{33}(Z - Z_0)} + \Delta y$$

where $x_0$ and $y_0$ are the principal point offsets (distance from centre of image to intersection of optical axis and image plane), x and y are the 2D target coordinates in the image plane, f is the focal length, the indexed values $r_{ij}$ are elements of the 3×3 rotation matrix of detection unit/camera orientation, (X,Y,Z) are the 3D target coordinates in object space, and $(X_0, Y_0, Z_0)$ are the 3D coordinates of the detection unit/camera.

The measurements are processed using common solving algorithms such as least squares fitting, where many instances of the colinearity equations above (two equations for each target seen by a detection unit/camera, with no limit to the number of targets or detection units/cameras) are solved simultaneously. Those skilled in the art recognise that inherent to the least squares method is a rigorous uncertainty calculation.

As the position of the reference targets 50 is already known, this provides the positions of the detection units 20. This is able to calibrate the system 18 by providing a reference coordinate system with respect to which the position of the object 38 to be measured can be determined as described below.

Once the system has been calibrated, the position of the object 38 can be detected.

A plurality of targets 10 and/or one or more probes 42 are used to probe the object 38.

The detection units 20 are then operated as described above, but now the targets 10 affixed to the object 38 as well as the reference targets 50 are detected by the detectors 24. The detectors 24 are operated to take measurements as described above, and these measurements are communicated to the processor as described above.

Using the reference coordinate system determined from the relative measurements of the detection units 20, the relative position of the targets 10, affixed to the object 38 or provided as reference targets 50, which are within the field of view of more than one detection unit 20, is calculated.

The relative position of the object 38 is thereby determined.

However, the calibration of the system 18 does not need to be performed as a separate step before the position of the object 38 is detected. The calibration of the system 18 can be performed at the same time as the calculation of the position of the object 38. Constantly performing calibration as the system 18 is in operation can provide drift monitoring to ensure the continued accuracy of the system.

With reference to FIGS. 6 to 12, embodiments utilising absolute distance measurement are described below.

Figure 6:
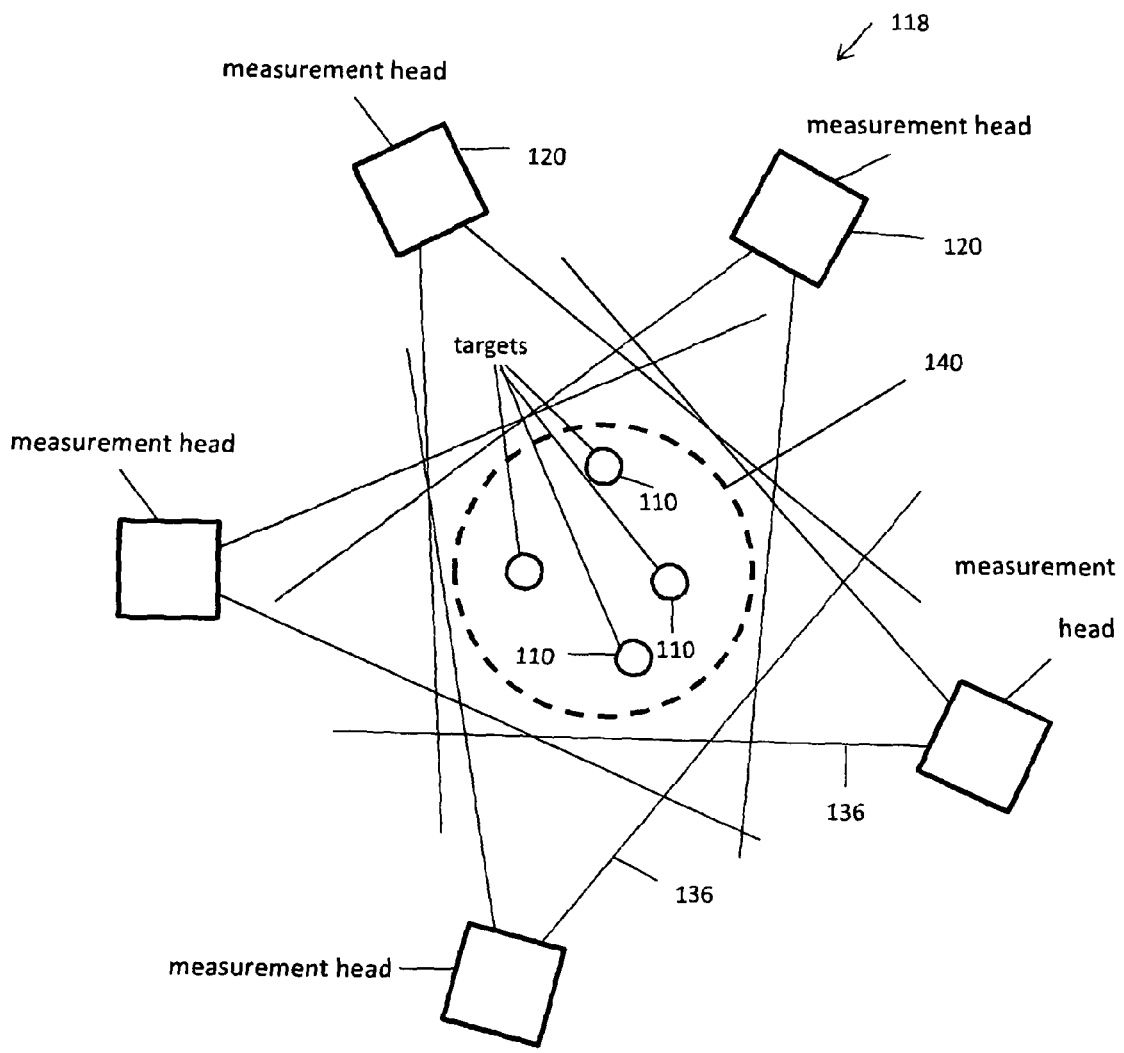
FIG. 6 is a schematic diagram of a position detection system according to an embodiment of the invention.

FIG. 6 shows a position detection or measurement system 118 using targets 110. The targets 110 correspond to a target 10 as described with respect to FIG. 1.

The system shown in FIG. 6 is designed to detect the position of an object (not shown) within a volume 140. The system 118 comprises a plurality of detection units 120 arranged at various locations around the volume 140.

Figure 7:
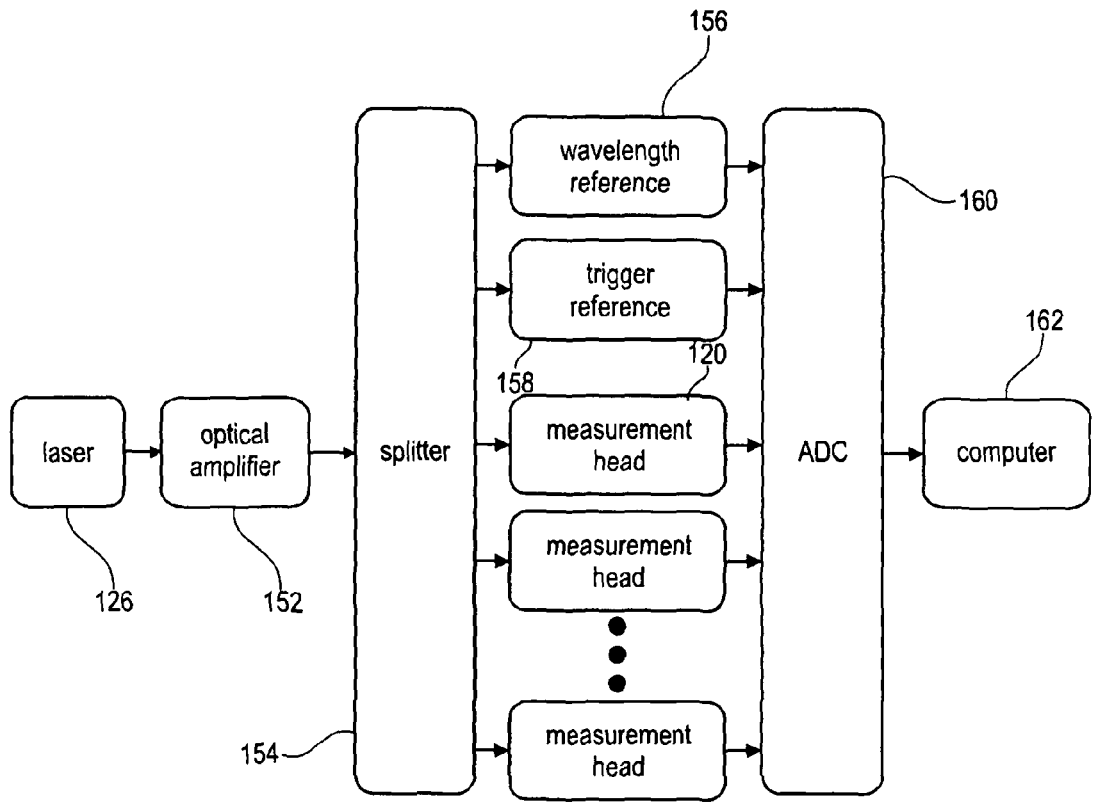
FIG. 7 is a schematic overview of the position detection system of FIG. 6.

FIG. 7 is a schematic overview of the measurement system 118. Light from a light source in the form of tuneable laser 126, preferably operating at wavelengths between 1530 nm and 1560 nm, is sent through an optical fibre to an Erbium Doped Fibre Amplifier (EDFA) 152 The EDFA 152 amplifies the light, increasing its power. The output of the EDFA 152 is sent through an optical fibre to a fibre splitter tree 154. The fibre splitter tree 154 distributes the light arriving at its input between multiple outputs. These outputs comprise a frequency reference 156, a trigger reference 158 and one or more detection units in the form of measurement heads 120. The frequency reference 156, trigger reference 158 and measurement heads 120 each produce an electronic signal or signals which are digitised by an ADC 160. Data recorded by the ADC 160 is sent to a computer 162 for analysis and storage.

Figure 8:
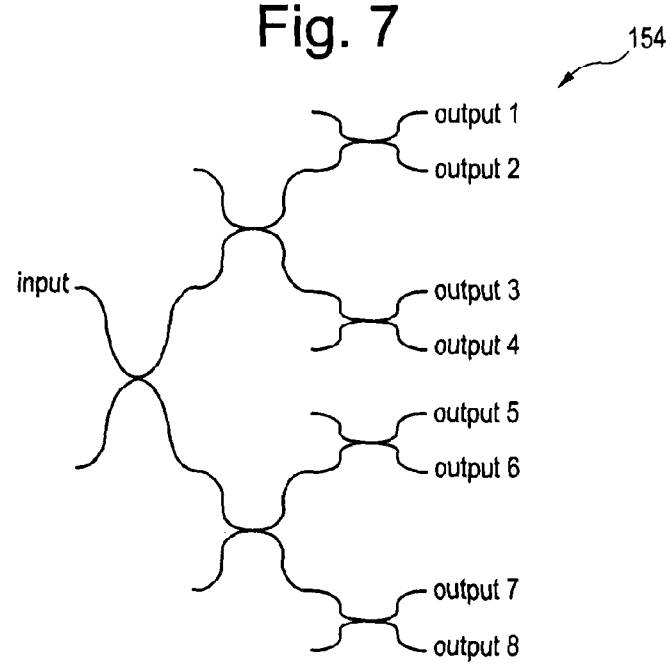
FIG. 8 is a schematic diagram of a fibre splitter of the position detection system of FIGS. 6-7.

FIG. 8 is an example schematic of a fibre splitter tree 154. The fibre splitter tree comprises a series of 2×2, fibre splitters, arranged so as to distribute light sent into an input fibre between multiple output fibres. The example illustrated in FIG. 8 distributes light evenly to 8 output fibres, however different arrangements of fibre splitters may be used to distribute light either evenly or unevenly to different numbers of output fibres.

Figure 9:
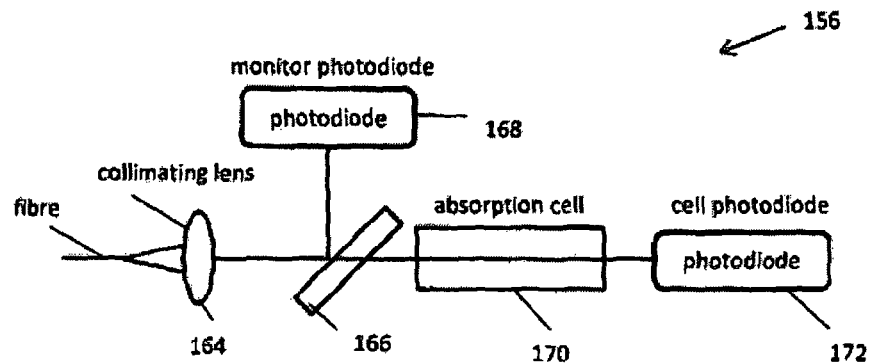
FIG. 9 is a schematic diagram of a wavelength reference for use in the position detection system of FIGS. 6-8.

FIG. 9 shows the frequency reference 156. Light from one of the fibre splitter tree 154 outputs is sent into the frequency reference 156. It exits the fibre end and is collimated by a collimating lens 164 into a free space beam. This beam is split into two parts with a plate beam splitter 166. A first portion of this split beam is directed onto a monitor photodiode 168. A second portion of the split beam is directed through a transparent cell 170 containing a gas, for example Acetylene, and the portion of the beam which is transmitted through this cell 170 is directed onto a cell photodiode 172. The glass beam splitter 166 through which the collimated beam passes is angled and/or wedged so as to direct beams created by unwanted reflections away from the photodiodes 168, 172, to avoid them disturbing the measurements.

Figure 10:
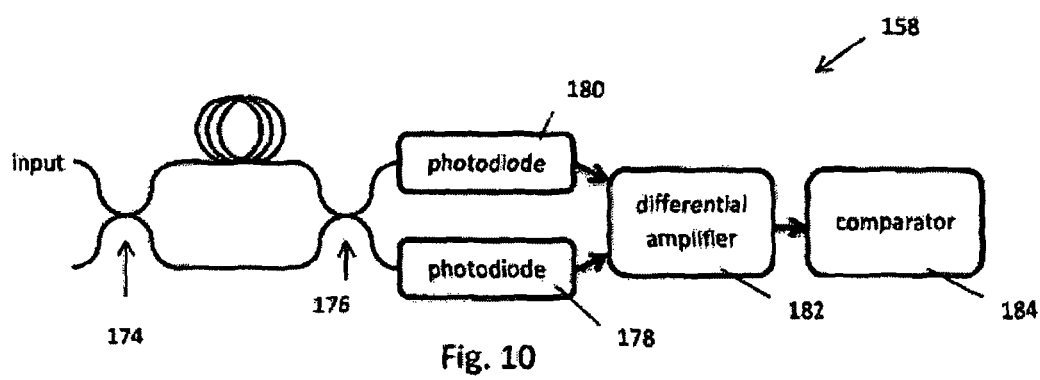
FIG. 10 is a schematic diagram of a trigger reference for use in the position detection system of FIGS. 6-9.

FIG. 10 shows the trigger reference 158. Light from one of the fibre splitter tree 154 outputs is sent into the input fibre of the trigger reference, where it is directed through a 50:50 fibre splitter 174. Light exiting the two fibre splitter 174 outputs is sent through lengths of optical fibre before being recombined at a second 50:50 fibre splitter 176. The two 50:50 fibre splitters 174, 176 and the fibre connecting them form a fibre Mach-Zehnder interferometer. The two lengths of fibre between the 50:50 fibre splitters 174, 176 have different lengths, creating an optical path difference between the light that travels down each arm. Light exiting each output of the second 50:50 fibre splitter 176 is directed onto one of a pair of photodiodes 178, 180. These are preferably balanced photodiodes; a pair of amplified photodiodes manufactured to have similar gain properties. The electrical outputs of the two photodiodes 178, 180 are sent to a differential amplifier 182. The output of the differential amplifier 182, which is a signal proportional to the difference in the two photodiode signals, is sent to a zero comparator 184. The zero comparator 184 outputs a Boolean logic value indicating the sign (positive or negative) of its input signal. The rising edge of the zero comparator output is used to trigger sample acquisitions in the ADC 160 of data from the frequency reference 156 and measurement heads 120.

Figure 11:
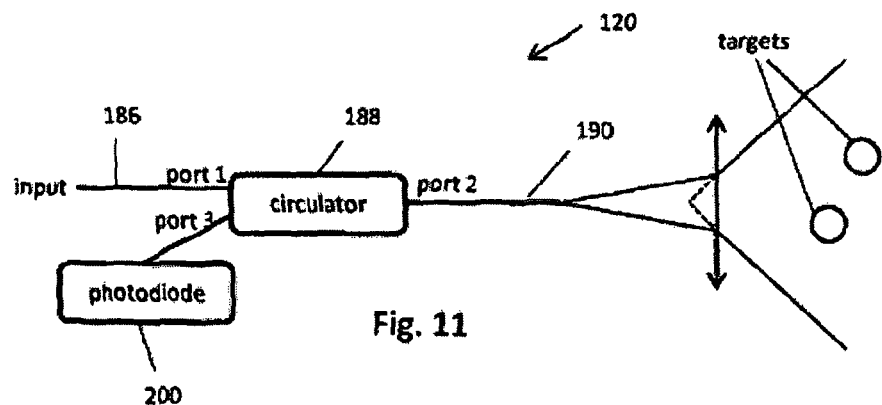
FIG. 11 is a schematic diagram of a detection unit for use in the position detection system of FIGS. 6-10.
Figure 12:
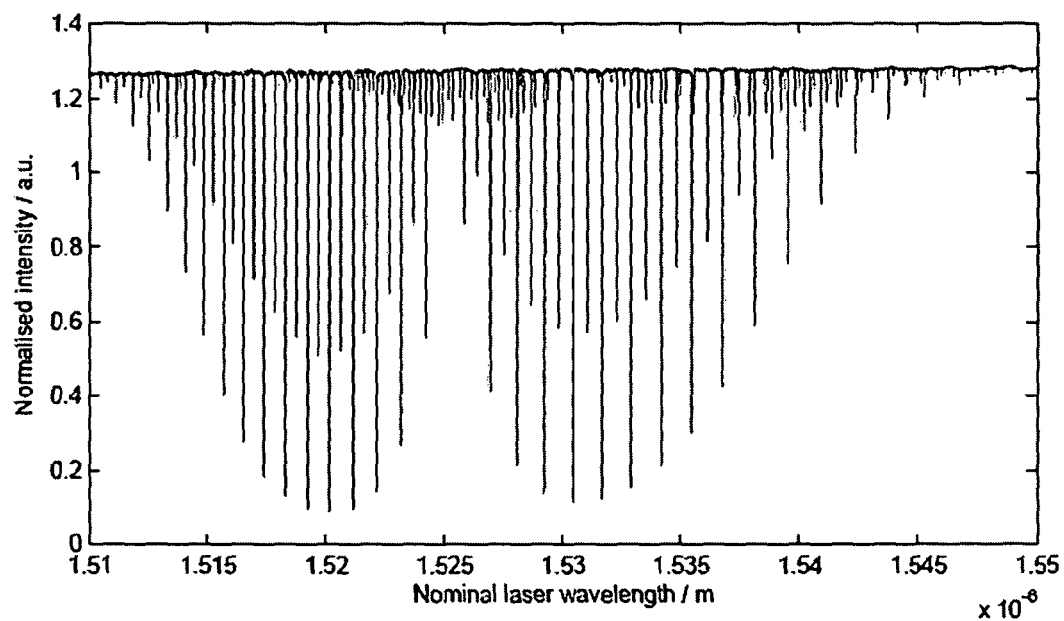
FIG. 12(*a*) is a graph showing an absorption curve for the gas of the cell of the wavelength reference of FIG. 9 and FIG. 12(*b*) is a graph showing in detail an absorption line of the graph of FIG. 12(*a*).
Figure 12:
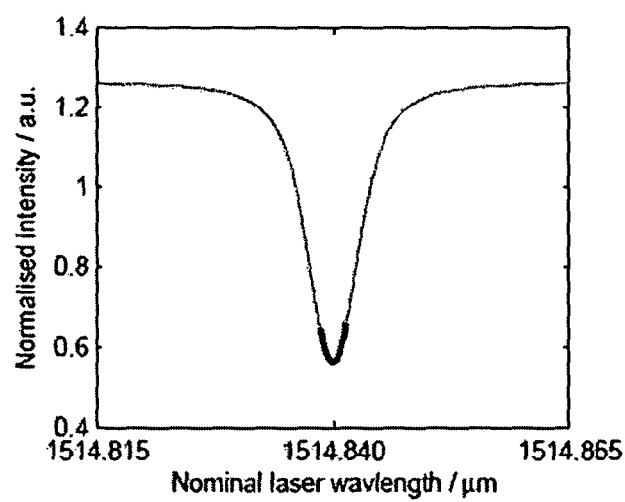

FIG. 11 is an illustration of a measurement head 120. Each measurement head 120 is provided with light from its own dedicated fibre splitter tree output. This is fed into the input fibre of the measurement head 120. It is then directed along a length of optical fibre 186 to port 1 of a fibre circulator 188. Light entering port 1 of the fibre circulator 188 is output from port 2 of the fibre circulator, where it travels along a length of fibre 190, reaching the fibre end. This fibre end is flat polished (i.e. the plane of the fibre end is perpendicular to a line pointing along the body of the fibre). Approximately 4% of the light reaching the fibre end will be reflected back into the fibre 190 towards port 2 of the fibre circulator 188. Light entering port 2 of the circulator 188 is output from port 3 of the circulator to a detector in the form of a photodiode 200.

The length of fibre 190 between the circulator 188 and fibre end is kept as short as possible (for example 10 cm) and ideally should be such that the optical path length along this fibre 190 is less than a minimum measurement distance. This consideration is due to Rayleigh backscattering of light travelling toward the fibre end in this section of optical fibre. The Rayleigh backscattered light creates a noise component that only affects measurement lengths shorter than the optical path length of this fibre. Therefore, by keeping the optical path length of this length of fibre shorter than a minimum measurement distance, it is possible to make measurements that are unaffected by this noise component.

Light exiting the fibre end is emitted in a cone of light. The measurement head is sensitive to targets 110 within this cone of light. In general, it is advantageous to alter the range of angles illuminated by light emitted from the fibre end in order to alter the range of angles the measurement head 120 is sensitive to. The figure shows a simple bi-concave lens used to increase the range of angles illuminated. However, different methods of altering the range of illuminated angles are possible, for example, a curved mirror, diffraction grating or spatial light modulator, and different configurations of illuminated angles are also possible by, for example, using a cylindrical lens.

FIG. 6 shows an example arrangement of several measurement heads 120 around a measurement volume 140. In this example the measurement volume consists of a volume in which targets 110 are within all measurement heads' detection volumes 136. If the line of sight between a target 110 and a measurement head 120 is blocked this arrangement can still perform measurements as in general there will be a line of sight from the target 110 to enough other measurement heads 120 to determine its location. Other arrangements of measurement heads 120 are possible.

A measurement comprises varying the wavelength of the tuneable laser 126 in a nominally linear manner, whilst simultaneously recording voltages from the frequency reference 156 and measurement heads 120 with the ADC 160. These measurements are recorded at intervals determined by the trigger reference 158 as discussed below. This data is then sent to the computer 162 to analyse, with the analysis output giving information on relative locations of the measurement heads 120 and targets 110.

Part of the laser power goes, via the EDFA 152 and splitter 154, to the trigger reference 158. In the trigger reference, the Mach-Zehnder interferometer generates two signals, 180 degrees out of phase, that vary nominally sinusoidally with laser frequency. These signals are detected with the photodiodes and the differential amplifier 182 outputs the difference between the two signals. This difference signal is itself a sinusoidal signal, but has a zero offset voltage. The comparator 184 generates a square wave signal from the output of the differential amplifier 182. This signal is sent to the ADC's sample trigger input. The ADC samples data from the frequency reference and measurement heads as discussed above upon a rising edge of this trigger signal.

Part of the laser power goes, via the EDFA 152 and splitter 154, to the frequency reference 156. The purpose of the frequency reference 156 is to provide information about the laser frequency at various points during the laser frequency sweep. The gas contained in the cell 170 in the frequency reference absorbs some of the light that passes through it. The fraction of light absorbed is dependent upon the laser frequency. The curve of absorption fraction versus frequency (or wavelength) is called an absorption curve. A typical absorption curve is shown in FIG. 12(a). It consists of a baseline level that is roughly transparent, with the presence of many absorption lines; narrow wavelength regions of strong absorption. A detail of one of these absorption lines is shown in FIG. 12(b). The central wavelengths of several of these absorption lines have known and highly stable values.

The purpose of the monitor photodiode 168 in the frequency reference, that records light not passing though the cell, is to compensate for fluctuations in laser power during the measurement. The voltage signal recorded by the cell photodiode 172 is divided by the voltage signal recorded by the monitor photodiode 168. This creates a signal that is proportional to the absorbance of the cell at the current laser wavelength, and is unaffected by variations in laser power.

The photodiode voltages are recorded throughout the laser frequency sweep. The times during the measurement where the laser wavelength was at the centre of an absorption line are found by, for example, performing a least squares fit to the recorded data. The value of the laser wavelength at these times is then known to be the wavelength corresponding to the central wavelength of the absorption peak.

In each measurement head 120, light reflected from the end of the optical fibre 190 forms the reference arm of an interferometer. Light emitted from the fibre end, reflected off a target, and coupled back into the fibre 190, forms another arm of the interferometer. Light from both these interferometer arms exits port 3 of the circulator 188 and is detected by the detector photodiode 200. Interference between light in these two interferometer arms generates an intensity signal upon the photodiode 200, $I_{det}$.

$$I_{det}=I_{ref}+I_{meas}+2\sqrt{I_{ref}I_{meas}}\cos(2\pi D\nu/c) \quad (1)$$

where $I_{ref}$ and $I_{meas}$ are the individual intensities of the reference and measurement arms respectively, D is the optical path difference between reference and measurement arms, and $\nu$ is the laser frequency.

If multiple targets 110 are within the field of view of the measurement head 120, multiple interference signals will be generated, for example between the reference arm and the measurement arms or between the measurement arms. In general, only the interference between the reference arm and individual measurement arms is observable, due to the much smaller power in the measurement arms compared to the reference arm.

The Fourier transform of the recorded signal from each measurement head 120 is calculated. This contains peaks at frequencies proportional to distances to targets, plus an offset frequency due to additional optical path length caused by the beam passing through material with a refractive index greater than 1 (such as glass forming a diverging lens and glass forming the target). that must be calibrated. This offset frequency may be calibrated using knowledge of the geometry and refractive index of the material involved, or by including the offsets as parameters in the same least squares fitting process that determines positions of measurement heads and targets, which is described later. These Fourier transform peaks are located and their frequencies determined (for example, by using a least squares fitting method), resulting in a set of measured frequencies for each measurement head 120.

Once the calibrated offset has been subtracted, these frequencies are proportional to distances to targets. The constant of proportionality is calculated using the frequency reference 156. Due to the use of the trigger reference 158, the data is sampled at constant intervals of laser frequency, $\delta\nu$. From equation (1), the measured frequencies are therefore $$f=2\pi D\delta\nu/c \quad (2)$$

Equation (2) may be rearranged to calculate D, $$D=fc/2\pi\delta\nu. \quad (3)$$

The unknown $\delta\nu$ is calculated using the frequency reference 156. The centres of two absorption peaks of known frequency difference $\Delta\nu_{diff}$ are located, for example by least squares fitting the data in the vicinity of each peak. The number of samples m between the two peaks is calculated. Note that this may be done with a precision better than 1 sample as the peaks themselves may be located with a precision better than 1 sample. It is then possible to calculate $\delta\nu$ as $\delta\nu=\Delta\nu_{diff}/m$.

With $\delta\nu$ known, the D corresponding to each measured frequency is calculated using equation (3). Those skilled in the art will realise that D corresponds to an optical path difference, and that calculating an accurate physical distance from this requires calculating the refractive index of the ambient air. This is a common procedure and may be done, for example, by measuring the temperature and humidity of the air and using any of various equations that relate these quantities to refractive index to determine the refractive index of the ambient air.

It is not known initially which target 110 corresponds to which measured distance. Therefore, a target identification algorithm must be performed to determine this. This algorithm takes as inputs the sets of distance measurements from each sensor, and also optionally a-priori information about the relative location of some measurement heads 120 or targets 110. From this it identifies which measured distance from each measurement head 120 corresponds to which target 110. This may be done, for example, by performing the analysis in the next step for all possible arrangements of targets, and selecting the one which agrees best with the data.

When there has been a correspondence assigned between measured distances and targets, the relative positions of all measurement heads and targets are determined using a least squares fit to the measured distances between measurement heads and targets.

Modifications can be made to the above embodiments. For example, the position detection system 18 described with reference to FIGS. 2 to 5 can be combined with the measurement system 118 described with reference to FIGS. 6 to 12 to provide a system which simultaneously provides angle-based and absolute distance measurement. In one such modification, the detection units 20 of the system 18 can leave incorporated into them the features of a measurement head 120 as described with reference to the FIGS. 6 to 12.

The systems described above have application in many different industries, especially in the assembly and manufacturing of high-value components and assemblies, metrology guided machining, metrology assisted assembly, jigless manufacture, hybrid metrology solutions and general coordinate measurement.

It can be used in the general measurement of components and assemblies, for example to determine the precise dimensions and/or relative position and orientations of those components and assemblies.

Since the measurements by different detection units 20 and/or measurement heads 120 are taken simultaneously, the system is able to detect the position of any given target 10, 110 at a precise moment in time, rather than calculating an average over a time period. The system therefore has particular application to tracking movement of objects precisely in 6 degrees of freedom. This is of assistance during the assembly of a complex apparatus in which components need to be moved into connection or precise alignment. Simultaneous measurements from different detection units 20 and/or measurement heads 120 can reduce the error in the position calculation and therefore reduces the error in the assembly construction. Applications therefore exist in measurement assisted and metrology assisted assembly and jigless assembly.

Examples of the assembly of complex apparatus in which embodiments of the invention can usefully be employed include in the aerospace industry for assembling components of an aeroplane such as the fuselage. However, other measurement assisted assembly systems can also usefully employ the system described above.

As well as assembly, the system described above can be usefully employed in robot control and guidance and for monitoring existing assemblies for example to ensure their continued stability. Examples of assemblies which can beneficially be monitored with a system according to embodiments of the invention include assembly jigs, wind turbines and machine tools. The precise and accurate measurements possible with the systems described above enable drift and misalignment to be detected accurately and at an early stage to enhance the performance and safety and maintain the calibration of the assemblies.

The divergence of emitted light to illuminate a for example conical region enables a large volume to be continuously monitored. This makes the system according to embodiments of the invention suitable for real time tracking of moving objects, such as for example for gravimetric application in spacecraft to track free-floating objects.

Other applications of embodiments of the invention include for example the film and TV industries, and automotive, power generation, defence, and space technologies, for example, thermal vacuum testing of structures.

Embodiments of the invention can also be used for general alignment measurement and deformation analysis, such as measuring the dynamic deformation of a large structure such as a wind turbine.

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

The disclosures in British patent application number 1205563.8, from which this application claims priority, and in the abstract accompanying this application are incorporated herein by reference.

The invention claimed is:

1. A position detection system for detecting a three dimensional position of plurality of targets, including:
   the plurality of targets, wherein each target is configured to act as a retro-reflector for light incident from any direction;
   a plurality of detectors configured to detect and take measurements of light retro-reflected from the targets, individual targets of the plurality of targets being surrounded by at least a subset of the plurality of detectors;
   at least one light emitter for illuminating the targets, the or each light emitter being for illuminating a plurality of the targets and including a diverging element, the diverging element being configured to direct the light from a light source to the plurality of targets and direct the light retro-reflected by at least one of the plurality of targets to at least one of the plurality of detectors; and
   a processor configured to process measurements taken simultaneously by individual detectors of the plurality of detectors to determine the three dimensional position of the targets using absolute distance measurements determined from measurements from the at least one detector using frequency scanning interferometry.

2. A position detection system according to claim 1, wherein each target is generally spherical.

3. A position detection system according to claim 1, wherein the or each diverging element is configured to diverge emitted light to illuminate a generally conical region.

4. A position detection system according to claim 1, wherein the or each light emitter includes a directing element for directing light configured to direct emitted light in a predetermined direction and to direct retro-reflected light to a detector.

5. A position detection system according to claim 1, wherein the light which each light emitter is configured to emit has a wavelength within a predetermined range of wavelengths.

6. A position detection system according to claim 5, wherein the or each target is spherical and comprises a material selected to act as a retro-reflector for light which is incident on the center of the or each target and which has a wavelength within the predetermined range of wavelengths.

7. A position detection system according to claim 5, wherein:
   each target is spherical and solid; and
   at a wavelength within the predetermined range of wavelengths, each target has a refractive index in the range of from 1.9 to 2.1.

8. A method of determining a three dimensional position of one or more objects, including:
   affixing a plurality of targets to one or more objects, wherein each target is configured to act as a retro reflector for light incident from any direction;
   illuminating the targets with diverging light from at least one light emitter including a diverging element for diverging light, wherein the diverging element is configured to direct the light from a light source to the targets and direct the light retro-reflected by at least one of the plurality of targets to at least one of a plurality of detectors;

detecting and simultaneously taking measurements of light retro-reflected from the targets via the detectors, and determining absolute distances to the targets using frequency scanning interferometry, wherein individual targets of the plurality of targets being surrounded by at least a subset of the detectors; and processing measurements of the retro-reflected light to determine the three dimensional position of the targets and thence determining the three dimension position of the one or more objects.

9. A position detection system according to claim 2, wherein each target is a sphere.

10. A position detection system according to claim 1, wherein the or each diverging element includes a lens.

11. A position detection system according to claim 4, wherein the detector is a photodiode.

12. A position detection system according to claim 1, wherein the at least one light emitter is a plurality of light emitters; the system including a light source for providing light to each of the plurality of light emitters via a fibre splitter tree, the frequency or wavelength of the light source being variable.

13. A method according to claim 8, including:
providing the light from the light source to the at least one light emitter via a fibre splitter tree; and
varying the frequency or wavelength of the light source.

14. A position detection system according to claim 1, wherein the at least one light emitter is arranged such that an optical path from the or each light emitter to a target at least partially coincides with an optical path from that target to the or a corresponding detector.

15. A position detection system according to claim 1, wherein the system is operable to take measurements including angles at which retro-reflected light is received and wherein the processor is operable to use the angle measurements to correlate which absolute distance measurements relate to which target.

16. A position detection system according to claim 1, wherein the or each target is surrounded by light emitters.

17. A method as in claim 8, including directing with a light director emitted light in a predetermined direction and retro-reflected light to a detector.

18. A method as in claim 8, wherein an optical path from the or each light emitter to a target at least partially coincides with an optical path from that target to the or a corresponding detector.

19. A method as in claim 8, including:
taking measurements including angles at which retro-reflected light is received; and
using the angle measurements to correlate which absolute distance measurements relate to which target.

* * * * *